United States Patent [19]

Sato et al.

[11] Patent Number: 4,591,303
[45] Date of Patent: May 27, 1986

[54] DRILLING TOOL

[75] Inventors: Yoshihiro Sato, Yokohama; Kenichi Sasaki, Hino; Tatsuo Miyamoto; Hideo Tsuzaka, both of Kawasaki, all of Japan

[73] Assignees: Tokyo Shibaura Denki Kabushiki Kaisha; Toshiba Tungaloy Co., Ltd., both of Kawasaki, Japan

[21] Appl. No.: 562,584

[22] PCT Filed: Oct. 19, 1982

[86] PCT No.: PCT/JP82/00413
§ 371 Date: Dec. 13, 1983
§ 102(e) Date: Dec. 13, 1983

[30] Foreign Application Priority Data

Apr. 15, 1982 [JP] Japan ................................. 57/62972

[51] Int. Cl.$^4$ ..................... B23B 41/02; B23B 51/04
[52] U.S. Cl. ..................... 408/206; 408/227; 408/233; 408/703; 408/713
[58] Field of Search ............ 408/200, 203, 203.5, 408/204–206, 227, 703, 201, 202, 228–230, 231–233, 705, 713

[56] References Cited

U.S. PATENT DOCUMENTS

| 3,548,687 | 12/1970 | Holloway | 408/204 |
| 3,591,306 | 7/1971 | Kaser | 408/204 |
| 4,129,400 | 12/1978 | Wozar | 408/703 X |
| 4,149,821 | 4/1979 | Faber | 408/226 X |
| 4,230,429 | 10/1980 | Eckle | 408/228 X |
| 4,500,234 | 2/1985 | Orth et al. | 408/206 |

Primary Examiner—Gil Weidenfeld
Assistant Examiner—Steven C. Bishop
Attorney, Agent, or Firm—Oblon, Fisher, Spivak, McClelland & Maier

[57] ABSTRACT

A plurality of cutting tips are mounted on the distal end of the cylindrical main body of a drilling tool for performing trepanning. These tips are disposed along the circumferential direction of the main body and equidistantly spaced apart from one another. The force, which is produced by all of the cutting tips and acting at right angles to the axis of the main body, is smaller than the component of the cutting force, which is produced by each tip and acting at right angles to the axis of the main body. The cutting widths of the tips in the radial direction of the main body are substantially equal. One of the tips, which is located at an intermediate position in the radial direction, has a V-shaped leading portion.

6 Claims, 10 Drawing Figures

DRILLING TOOL

TECHNICAL FIELD

The present invention relates to a drilling tool having a plurality of cutting tips (inserts) which enable it to perform trepanning.

BACKGROUND ART

Among contemporary drilling tools, the drilling tool for performing trepanning, to leave the central columnar portion of a material, generally has low cutting energy consumption and a small thrust at the time of cutting, as compared to other types of cutting tools for cutting into entire portions of pieces, such as those used in cutting a hole. For this reason, only limited machining power can be used effectively, and drilling with higher efficiency can be performed by the same cutting force as in other types of drilling tools. In addition to this advantage, the core portion which is removed can be reused.

However, such a trepan drilling tool comprises a cylindrical cutting tool which does not have a portion corresponding to the center of rotation, so that both chatter vibration and swinging tend to occur during cutting, particularly at the start of cutting. To avoid such problems in the conventional trepan drilling tool, a guide pad is mounted around the tool. Alternatively, a centering drill is mounted at the center of the tool, to reduce the chatter and swinging at the start of drilling, and a guide pad is mounted to guide the tool after the leading part has cut into the material.

In the conventional trepan drilling tool, a guide pad and a guide bush must be mounted, and these members must be adjusted before drilling. Furthermore, a center hole must be predrilled. As a result, the predrilling time becomes longer than the drilling time, so that the entire drilling operation becomes time-consuming and extremely inefficient.

Since the present invention has been contrived to eliminate the drawbacks described above, its primary object is to provide a trepan drilling tool which has good cutting force balance and reduces chatter vibration and swinging, both at the start of drilling and after the leading part has cut into a workpiece.

DISCLOSURE OF INVENTION

In a drilling tool having a plurality of cutting tips at the annular end of a cylindrical main body, allowing said tool to perform trepanning, the cutting tips are so disposed along the annular end of the main body as to be equidistantly spaced apart from each other, in such a way that the resultant force, which is produced by all of the cutting tips and acting at right angles to the axial direction of the main body, becomes smaller than the component of the cutting force, which is produced by each individual cutting tip and acting at right angles to the axial direction of the main body.

Furthermore, according to the present invention, in a drilling tool having a plurality of cutting tips at the annular end of a cylindrical main body, allowing said tool to perform trepanning, the cutting tips are equidistantly spaced apart from each other along the annular end of the main body, the cutting widths of the cutting tips in the radial direction of the main body are substantially equal, and an intermediate cutting tip among the cutting tips disposed at an intermediate position in the radial direction of the main body has a V-shaped cutting edge.

The cutting force is thus well balanced, and both chatter vibration and the swinging of the tool, at the start of drilling or after the leading part of the tool has cut into the workpiece, can be reduced. In addition to this advantage, since chatter/swinging prevention jigs such as a guide bush are not required, the preparation time for drilling can be shortened. Since a good cutting balance is obtained, drilling precision and efficiency are improved, and the worked surface is thereby smoothened.

BEST MODE FOR CARRYING OUT THE INVENTION

Figure 1:
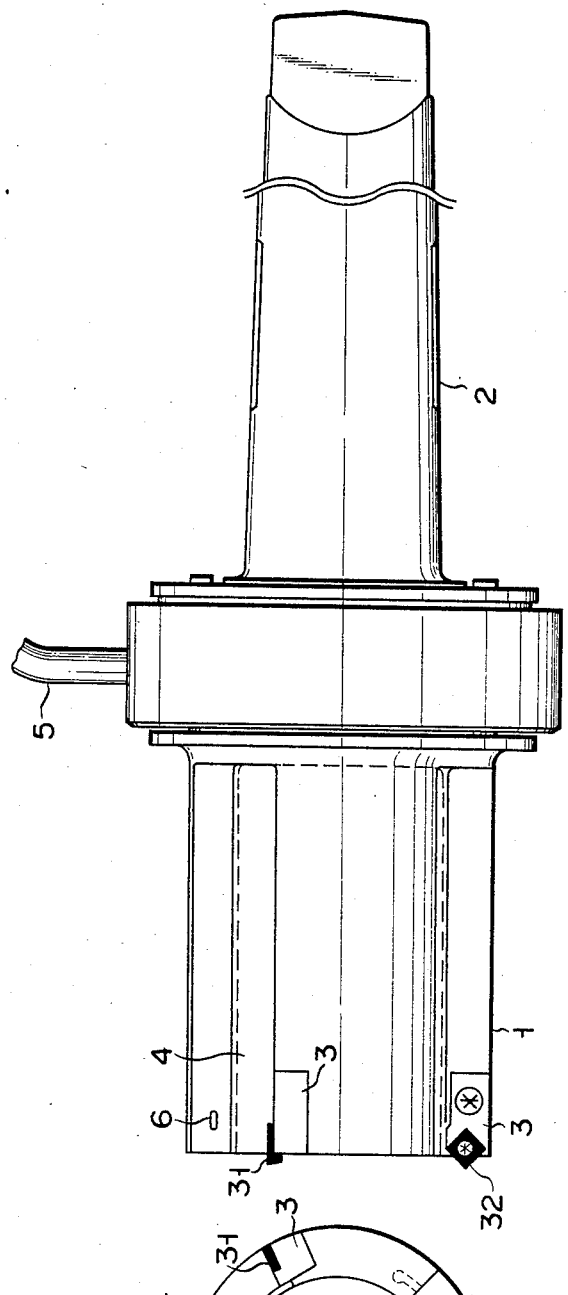
FIG. 1 is a front view of a drilling tool according to an embodiment of the present invention.
Figure 2:
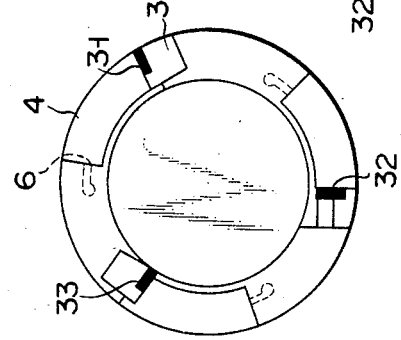
FIG. 2 is a side view thereof.
Figure 3:
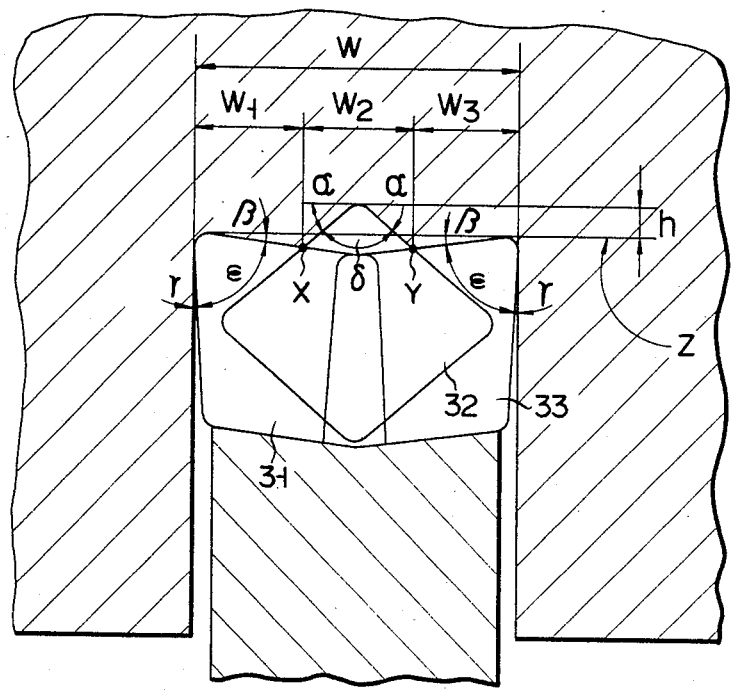
FIG. 3 shows the disposition of cutting tips at the distal end portion of the tool shown in FIG. 1.

Embodiments of the present invention may be described as follows, with reference to the accompanying drawings. In FIGS. 1 to 3, reference numeral 1 denotes a cylindrical main body. A rod 2 is integrally disposed with respect to the proximal end (rear end) of the main body 1, in such a way as to mount the drilling tool on a machine tool (not shown). The main body 1 and the rod 2 constitute the drilling tool. Three chip discharge grooves 4 are formed on the outer surface of the main body 1, from the distal end to the proximal end so as to extend in the longitudinal direction of the main body 1. Each of the cutting tips 31, 32, 33 is mounted on one side wall of its corresponding chip discharge groove 4. In this embodiment, the cutting tips 31, 32, 33 are equidistantly disposed in the circumferential direction of the main body 1. However, the number of cutting tips is not limited to three. Any other number of cutting tips may be disposed in the circumferential direction of the main body 1, being equidistantly spaced apart from each other in their corresponding grooves. The cutting tips 31, 32, 33 are mounted on cartridges 3, and the cartridges 3 are bolted to the side walls of the corresponding chip discharge grooves 4 of the main body 1.

Cutting widths W1, W2, W3 of the cutting tips 31, 32, 33, when viewed in the radial direction of the main body 1, are substantially equal. The cutting tips 31, 32, 33 are offset from each other in the radial direction of the main body 1. More particularly, the outer tip 31 is mounted in the corresponding discharge groove 4 in an outer position along the radial direction of the main body 1. The inner tip 33 is mounted in the side wall of the corresponding discharge groove 4 in an inner position along the radial direction of the main body 1. The intermediate tip 32 is mounted in the corresponding discharge groove 4 in an intermediate position between the outer and inner tips 31 and 33. Therefore, the cutting tips 31, 32, 33 cut different portions of a cutting region having an overall width of W. The distal end of the intermediate tip 32 extends slightly beyond those of the outer and inner tips 31, 33, with respect to the cutting direction (distal end along the axis of the main body 1). Thus, since the distal end of the intermediate tip 32 extends beyond those of the outer and inner tips 31, 33, a groove formed by the intermediate tip 32 can serve as a guide groove for the outer and inner tips 31, 33, thereby preventing the vibration of the drilling tool during cutting. However, when the extension h of the intermediate tip 32 is excessive (FIG. 3), it is a long time after the intermediate tip 32 starts cutting the workpiece before the outer and inner tips 31, 33 begin to cut the workpiece. An unbalanced cutting state, wherein only the intermediate tip 32 is used for cutting, is thus maintained for a long period of time. As a result, the drilling tool vibrates excessively, and the cutting state becomes unstable. Therefore, an intersection X between the outer tip 31 and the intermediate tip 32, and an intersection Y between the intermediate tip 32 and the inner tip 33, are located behind a line Z connecting the vertices of the outer and inner tips 31, 33 with respect to the cutting feed direction, in such a way as to bring all of the cutting tips 31, 32, 33 into use within a short period of time.

The cutting edge angles $\beta$ of the outer and inner tips 31, 33 and a cutting edge angle $\alpha$ of the intermediate tip 32 are so determined as to substantially equalize the cutting widths W1, W2, W3 of the cutting tips 31, 32, 33. In this case, if the cutting edge angle $\alpha$ is too great, the cutting edge vertex angle $\delta$ of the intermediate tip 32 is decreased. As a result, the cutting edge strength is decreased, and the cutting resistance is increased. In addition to these disadvantages, chip discharge becomes cumbersome. The cutting edge angle $\alpha$ should preferably fall within a range of between 15° and 40°. The outer and inner tips 31, 33 must have clearance angles $\gamma$, besides their cutting edge angles $\beta$, in the cutting feed direction. Therefore, the cutting edge angles $\epsilon$ must be 90° or less.

As shown in FIG. 3, the respective cutting edge angle requirements are satisfied by using a rhombic throwaway tip. An obtuse corner of a rhombic material is used as the intermediate tip 32. Acute corners of the rhombic material are used as the outer and inner tips 31, 33. As a result, all four corners of each can be effectively used.

Figure 4:
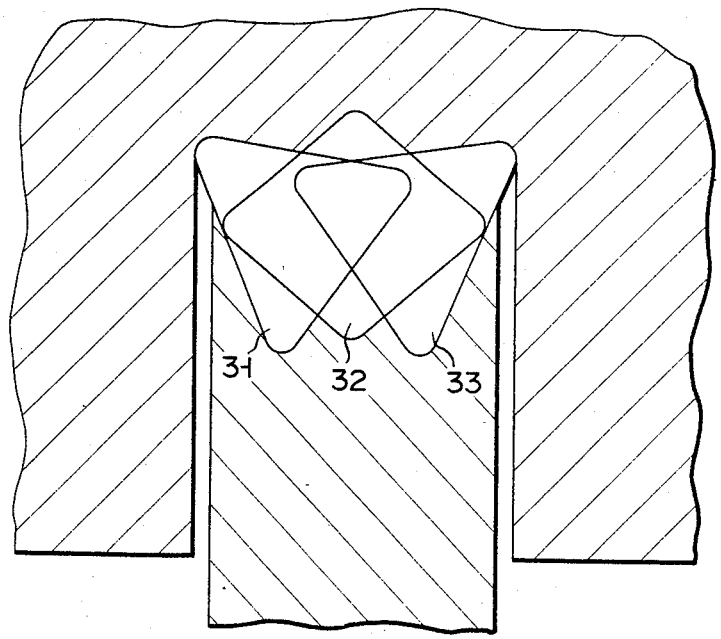
FIG. 4 shows the disposition of cutting tips according to another embodiment of the present invention.

A modification of the cutting tips is shown in FIG. 4. As shown in FIG. 4, triangular cutting tips are used as the outer and inner tips 31, 33.

An oil supply unit 5 is mounted on the outer surface of the proximal end of the main body 1, in such a way as to supply a cutting lubricant to the drilling tool. The oil supply unit 5 will not rotate, even if the main body 1 is rotated. The oil supply unit 5 supplies oil to an oil channel (not shown) disposed in the axial direction of the main body 1. The oil in the oil channel is sprayed onto the cutting tip 31, or the like, from an injection port 6 which is formed on a side wall of each of the chip discharge grooves 4 and which communicates with the oil channel.

Figure 5:
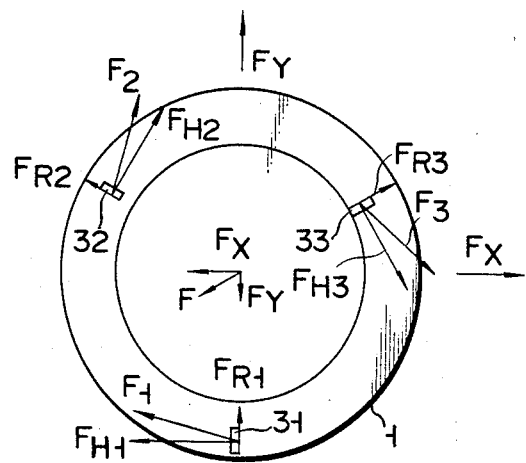
FIG. 5 is a representation for use in explaining the cutting force acting on the drilling tool at the time of cutting.
Figure 9:
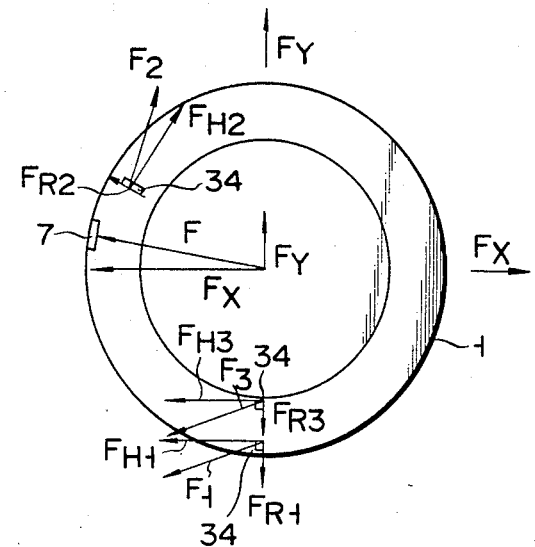
FIGS. 9 and 10, respectively, are representations for use in explaining the cutting force obtained with cutting edge dispositions of the conventional drilling tool.
Figure 10:
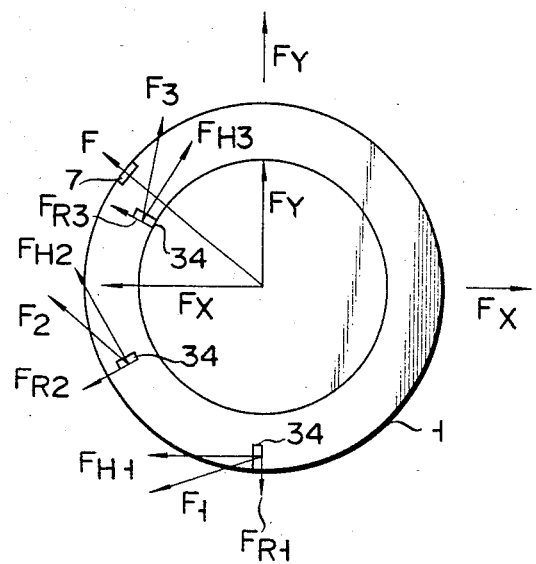

The drilling tool having the structure described above tends not to be subject to chatter vibration or swinging. The reason for this may be explained with reference to FIG. 5. In FIG. 5, reference numerals F1, F2 and F3 denote perpendicular components of the cutting force which acts on cutting tips 31, 32 and 33, respectively. Reference numeral $F_R$ ($F_{R1}$, $F_{R2}$ and $F_{R3}$) denotes each of the rear components of the perpendicular components of the cutting force which acts on cutting tips 31, 32 and 33. Reference numeral $F_H$ ($F_{H1}$, $F_{H2}$ and $F_{H3}$) denotes each of the main components of the perpendicular components of the cutting force which acts on cutting tips 31, 32 and 33. The resultant force of the main and rear components $F_H$ and $F_R$ constitutes a perpendicular component F of the cutting force which is acting at right angles to the axis of the drilling tool (i.e., the cutting force imbalance acting on the drilling tool). Reference numeral $F_X$ denotes an X component of the resultant force F; and $F_Y$, a Y component thereof. As may be seen from FIG. 5, the perpendicular component F of the cutting force with respect to the tool axis (axis of the main body 1) is smaller than that of the component F1, F2 or F3 of the cutting force which acts on the individual cutting tips 31, 32 or 33. The components of the cutting force can be well balanced, so that chatter vibration and swinging of the tool tend not to occur. However, in the conventional drilling tool which does not have well-balanced cutting force components with respect to the disposition of the cutting tips 34, as shown in FIGS. 9 and 10, the perpendicular component F of the cutting force produced by the drilling tool is greater than the component F1, F2 or F3 of the cutting force produced by the corresponding cutting tip 34. As a result, chatter vibration or swinging tend to occur. Good cutting cannot be obtained without providing a guide pad 7, or the like, as shown in FIGS. 9 and 10.

Figure 6:
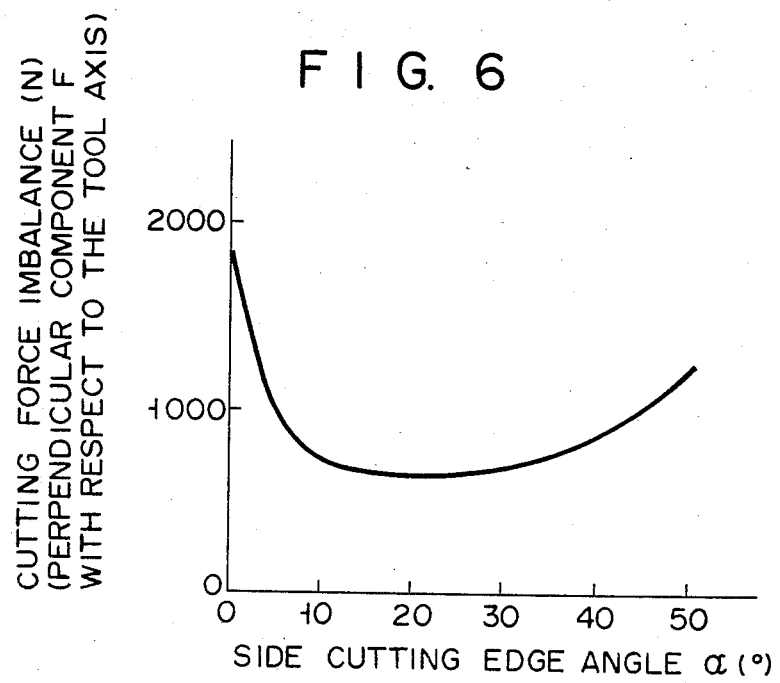
FIG. 6 is a graph showing the relationship between a side cutting edge angle $\alpha$ and a cutting force imbalance.

However, in the drilling tool of the other embodiment described above, the side cutting edge angle $\alpha$, $\beta$, or $\beta'$ of the cutting tip 32, 31 or 33 shown in FIGS. 3 and 4 falls within the range of between 5° and 40°. The cutting force imbalance (i.e., the perpendicular component F with respect to the axis of the tool) becomes smaller than 1,000 (N), as may be seen from the experimental results shown in FIG. 6. Thus, the cutting force imbalance is further improved, as compared to the previously described embodiment.

Figure 7:
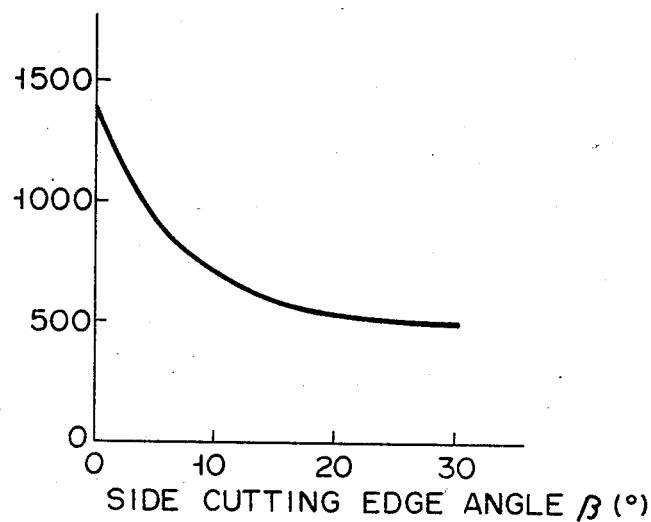
FIG. 7 is a graph showing the relationship between a side cutting edge angle $\beta$ and the cutting force imbalance.

Furthermore, when the side cutting edge angles $\beta$ of the cutting tips 31, 33 shown in FIG. 3 fall within a range of between 5° and 30°, the cutting force balance can be improved. FIG. 7 shows changes in the cutting force imbalance occurring when the side cutting edge angles $\beta$ of the cutting tips 31, 33 are altered. When the side cutting edge angle $\beta$ is set above 5°, the cutting force balance can be greatly improved. However, when the side cutting edge angle $\beta$ exceeds 30°, the vertex angle becomes less than 60°, so that the strength of the cutting tip is decreased, and chipping of the cutting tip tends to occur during cutting. Thus, the side cutting edge angle $\beta$ should be set at 30° or less.

Figure 8:
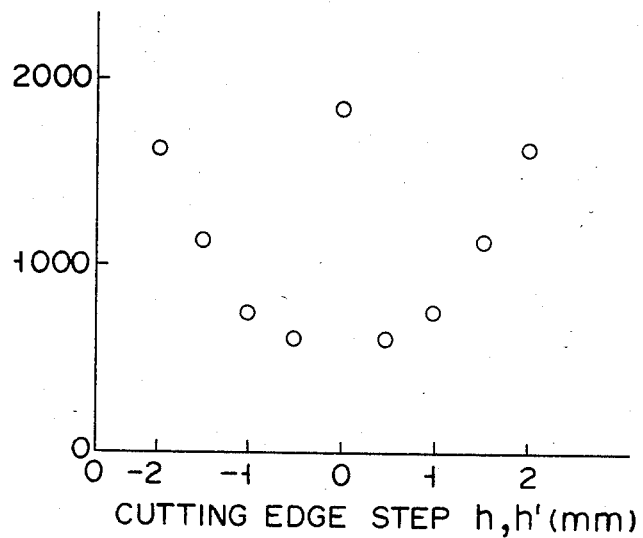
FIG. 8 is a graph showing the relationship between the cutting edge step and the cutting force imbalance.

In the drilling tool having the structure described above, the cutting tip step (i.e., the difference h (or h') between the leading portions of cutting tip 31 or 33 and the leading portion of cutting tip 32, which is used for cutting into the workpiece immediately, once cutting is begun) is arranged to fall within a range of between 0.1 and 1 mm. The cutting force imbalance (i.e., the perpendicular component F with respect to the axis of the tool)

is decreased to the level of 700 (N) or less, as may be seen from the experimental results shown in FIG. 8. The cutting force balance is improved and the cutting efficiency of the leading portions is greatly improved, as compared to the previously described embodiment.

Furthermore, since the cutting tip 32 which serves as the leading component among cutting tips 31, 32, 33 of the drilling tool has a V-shaped leading portion, as shown in FIGS. 3 and 4, the cutting efficiency of the leading component is further improved, as is apparent from the experimental results.

The rod 2 of the drilling tool of the previously described embodiments can be detachably mounted on the main body 1 thereof. The cutting tips 31, 32, 33 can be mounted by being brazed or bolted to the main body 1. In addition to these modifications, the main body 1 may be directly bolted to the machine tool, to increase the tool's rigidity.

INDUSTRIAL APPLICABILITY

The drilling tool according to the present invention is one which may be used in performing trepanning.

We claim:

1. A drilling tool for trepanning, comprising a cylindrical main body and three cutting tips disposed to be equidistantly spaced apart from each other along an annular end of the main body wherein:

the cutting tips are spaced from each other along a radial direction of the main body;

the cutting tips are shaped and oriented such that cutting widths of the cutting tips in the radial direction of the main body are equal;

an intermediate cutting tip disposed at an intermediate position in the radial direction of the main body has a V-shaped cutting edge and has a side cutting edge angle falling within a range of between 5° and 40°, a distal end of said intermediate cutting tip extending in a cutting feed direction of the main body beyond distal ends of outer and inner cutting tips; and said outer and inner cutting tips disposed at outer and inner positions in the radial direction have side cutting edge angles falling within a range of between 5° and 30°.

2. A drilling tool according to claim 1, characterized in that the outer, intermediate and inner cutting tips comprise rhombic cutting edge tips.

3. A drilling tool according to claim 1, characterized in that the intermediate cutting tip disposed at the intermediate position in the radial direction comprises a rhombic tip, and the outer and inner cutting tips comprise triangular tips.

4. A drilling tool according to claim 1 wherein said distal end of said intermediate cutting tip extends by 0.1 to 1 mm beyond said ends of said inner and outer cutting tips.

5. The drilling tool of claim 1 wherein there is no bush surrounding said main body.

6. The drilling tool of claim 1 wherein there are no wear pads on said main body.

* * * * *